United States Patent
Jackson

(10) Patent No.: US 8,446,699 B2
(45) Date of Patent: May 21, 2013

(54) RESIDUAL CURRENT DEVICE HAVING VOLTAGE DEPENDENT AND VOLTAGE INDEPENDENT MODES OF OPERATION

(75) Inventor: Jonathan Keith Jackson, Argyll (GB)

(73) Assignee: Eaton Industries Manufacturing GmbH (CH)

( * ) Notice: Subject to any disclaimer, the term of this patent is extended or adjusted under 35 U.S.C. 154(b) by 909 days.

(21) Appl. No.: 12/296,869

(22) PCT Filed: Apr. 11, 2007

(86) PCT No.: PCT/GB2007/001332
§ 371 (c)(1),
(2), (4) Date: Oct. 10, 2008

(87) PCT Pub. No.: WO2007/116221
PCT Pub. Date: Oct. 18, 2007

(65) Prior Publication Data
US 2009/0063064 A1 Mar. 5, 2009

(30) Foreign Application Priority Data
Apr. 12, 2006 (GB) .................................. 0607331.6

(51) Int. Cl.
*H02H 3/00* (2006.01)
(52) U.S. Cl.
USPC .................................. 361/42; 361/44; 361/45
(58) Field of Classification Search
USPC ................................................ 361/42, 44, 45
See application file for complete search history.

(56) References Cited

U.S. PATENT DOCUMENTS 3,733,517 A * 5/1973 Wilson .............................. 361/44
3,786,356 A * 1/1974 MacPhee .......................... 361/45
4,442,472 A * 4/1984 Pang et al. ....................... 361/96
4,685,022 A * 8/1987 Nichols et al. .................. 361/44

(Continued)

FOREIGN PATENT DOCUMENTS

| DE | 197 35 743 A1 | 2/1999 |
| EP | 0 814 555 A1 | 12/1997 |
| EP | 1 478 069 A | 11/2004 |

OTHER PUBLICATIONS

International Search Report, PCT/GB2007/001332, Jackson, Jonathan Keith, Jul. 31, 2007, 2 pages.

Primary Examiner — Rexford Barnie
Assistant Examiner — Tien Mai
(74) Attorney, Agent, or Firm — McKee, Voorhees & Sease, P.L.C.

(57) ABSTRACT

This invention relates to a residual current device which is able to safely and reliably operate when a line voltage is present (voltage dependent mode) and when the line voltage is not present or falls below a predetermined threshold level (voltage independent mode). The present invention is implemented as a residual current device having a trip mechanism for isolating an electric supply to an electrical installation upon detection of a predetermined current imbalance between the line and neutral conductors of said electric supply. The present invention comprises a current transformer having a secondary winding responsive to any current imbalance on said electrical installation, and a circuit protection winding being connectable to a processing means. The impedance of said processing means varies according to the level of the line voltage such that the device, under normal operation, behaves as a voltage dependent residual current device, but in the rare occasion where operation may be required when no line voltage is present, offers voltage independent protection.

18 Claims, 9 Drawing Sheets

U.S. PATENT DOCUMENTS

| | | | |
|---|---|---|---|
| 5,038,246 A * | 8/1991 | Durivage, III | 361/93.2 |
| 5,293,522 A * | 3/1994 | Fello et al. | 335/18 |
| 5,448,443 A * | 9/1995 | Muelleman | 361/111 |
| 6,469,882 B1 * | 10/2002 | Tignor | 361/93.1 |

* cited by examiner

RESIDUAL CURRENT DEVICE HAVING VOLTAGE DEPENDENT AND VOLTAGE INDEPENDENT MODES OF OPERATION

This invention relates to a residual current device. In particular, this invention relates to a residual current device which is able to safely and reliably operate when a line voltage is present (voltage dependent mode) and when the line voltage is not present or falls below a predetermined threshold level (voltage independent mode).

Circuit protection devices, such as residual current devices, are routinely used to monitor and protect against electrocution and fire risks on electrical installations. Residual current devices are generally classified by their construction as offering either voltage dependent (VD) or voltage independent (VI) modes of operation. The typical operation of a conventional voltage dependent RCD is depicted in FIG. 1, which shows an electrical load (i.e. electrical appliance, socket or circuit) connected to an electrical supply, via a VD RCD 10. The VD RCD 10 includes a set of latched contacts 12 which allows safe disconnection of the supply in the event of a residual fault occurring.

The principle of operation of these devices is well known, and a toroidal current transformer 14 is used to measure the sum of the live and neutral currents. The current transformer 14 detects the magnetic fields of the two mains conductors which flow in opposite directions and cancel in normal circumstances. The mains conductors form single turns on the magnetic toroidal core 14 and a secondary winding 16 of many turns is used to detect any magnetisation of the toroidal core 14.

A typical fault may be where a person touches the live conductor downstream of the RCD 10 allowing extra current to flow through live to ground, through the person. Since this current does not return in the neutral line, then an imbalance is detected in the toroidal current transformer 14. The signal detected by the current transformer 14 is referred to as a residual current. Such a signal is seen as a current in the secondary winding 16, which can be processed using analogue or digital processing means 18. If the outcome of the processing step 18 is that a dangerous condition exists, then a signal can be used to energise a mechanical actuator 20 which then operates a tripping mechanism 22, opening the contacts 12 and isolating the supply.

For the VD RCD 10 to function, the electronic processor 18 requires a power supply 24, which draws power from the electrical supply. For the power supply 24 to function, the electrical supply must be present above a certain threshold voltage. If the supply falls below the threshold voltage, then the VD RCD 10 cannot operate and no longer provides protection. As can be appreciated, even though the supply is lost or is perhaps below the threshold level required to power the electronic processor 18, hazardous fault currents can still occur on the electrical installation. Whilst a number of RCDs have been proposed with a minimum working voltage close to 50V ("Safe Extra Low Voltage" level), there is always the possibility of an excessive fault being present causing the line voltage to fall below 50V and therefore the device will not operate.

The other main disadvantage of this type of RCD is that integrity of the neutral conductor must be ensured to ensure safe operation of the device. Many RCDs overcome a broken or missing neutral fault condition by supplying a functional earth (FE) wire. However, in many installations, there may not be a suitable earth connection, and it is undesirable to use the earth loop circuit as a current return path.

The main advantages of this type of voltage dependent device are improved performance, and reduced sensitivity to temperature. Additionally, it is possible to monitor the neutral circuit and trip on missing neutral, if necessary in many devices. The latest digital VD RCDs also offer enhanced functionality. Also, since the energy from any residual current is connected to a separate signal processing stage to initiate the trip mechanism, conventional VD RCDs use smaller toroidal sensors with a lower inductance.

In an attempt to address the problem that there has to be a mains supply present above a certain threshold voltage to provide protection, voltage independent RCDs have been proposed, and the typical construction of a conventional VI RCD is shown in FIG. 2, which again depicts an electrical load connected to an electrical supply, via a VI RCD 30.

The significant difference from the VD RCD 10 shown in FIG. 1 is that there is no processing circuitry used, and the energy from any residual current is used directly to drive the mechanical actuator 32 which in turn isolates the supply via a trip mechanism 34 and contacts 36.

The VI RCD 30 has the advantage that if no voltage is present (e.g. live shorted to earth) then the VI RCD 30 can still operate on the energy from the residual current caused by a fault and sensed by a secondary winding 46 connected to a mechanical actuator 32. Generally, the energy available to drive the mechanical actuator 32 is very small (unlike the voltage dependent mode where large amounts of energy are available for mechanical actuation). This means that much of the energy to trip the mechanism 34 is stored in springs when the RCD 30 is manually reset by means of a mechanical lever on the outside of the case (not shown). Typically, a latched solenoid 32 is used which contains a compressed spring, which can be released by a relatively small amount of energy. This can produce enough force to trip the main mechanism 34 which itself stores energy in springs when the external reset lever is pushed to close the contacts 36.

The problems associated with this type of residual current device 30 lie with the mechanics of the system, which are very delicate and sensitive. Also, the size of the toroid 38 is usually very much greater than with voltage dependent RCDs 10 in order to be able to extract sufficient energy from the residual fault current. This causes a problem since it is common to use cheaper magnetic materials in VI RCDs in order to reduce costs, but which are more prone to permanent magnetisation. If the magnetic material of the toroidal core 38 becomes magnetised, the RCD 30 becomes less sensitive and may not trip when required. Such a situation may occur after a heavy residual fault current flows (e.g. short to earth). To prevent the core becoming heavily magnetised in this situation, a protection circuit 40 is used. This consists of a number of windings 42 and at least two back-to-back diodes 44. Under heavy fault conditions, the voltage in the winding 42 is high enough to allow the diodes 44 to conduct. The current that flows opposes further magnetisation of the toroidal core 38 helping prevent permanent magnetisation.

Generally, there are a number of disadvantages associated with this configuration. In particular, the operation of the high-sensitivity tripping mechanism 32, 34 is particularly sensitive to environmental pollutants. Foreign matter inclusions at the pole faces can prevent the release armature from closing properly, whereas moisture droplets trapped between the highly polished armature and pole faces can result in total non-operation of the tripping release due to inter-metallic bonding or 'stiction' and oxidisation.

Furthermore, interference, be it from either electromagnetic or environmental sources can interfere with the delicate balance of this intricate and sensitive VI RCD 30. In this very low energy system, this could involve unwanted tripping of the VI RCD 30, and at worst, could result in reduced tripping sensitivity and even total non-tripping in extreme circumstances.

Nevertheless, the main advantage of this configuration is the ability to offer protection from residual current fault irrespective of the line voltage.

Under nearly all foreseeable conditions, a voltage dependent RCD is adequate and, in many areas, its application is acceptable. In some other geographical areas, and some applications, there is a demand for voltage independent operation. However, as noted above, traditional VI RCD's tend to be basic and crude and lack the facility for any extra intelligence or features which VD RCDs can offer.

It is the object of the present invention to provide a residual current device which overcomes the drawbacks associated with both types (voltage dependent and voltage independent) of mode of operation. The device and method enabling safe and reliable operation when a line voltage is present or not. The device and method that, under normal operation, behaves as a voltage dependent RCD, but in the rare occasion where operation may be required when no line voltage is present, offers voltage independent protection.

According to the present invention there is provided a residual current device having a trip mechanism for isolating an electric supply to an electrical installation upon detection of a predetermined current imbalance between the line and neutral conductors of said electric supply, comprising:

a current transformer having the line and neutral conductors inductively coupled as a primary winding;

a secondary winding inductively coupled to said current transformer and connectable to said trip mechanism, said secondary winding being responsive to said current imbalance on said electrical installation; and a circuit protection winding inductively coupled to said current transformer and responsive to said current imbalance on said electrical installation, said circuit protection winding being connectable to a processing means for processing if said current imbalance exceeds said predetermined current imbalance, the impedance of said processing means varies according to the level of said line voltage.

In a preferred embodiment, the impedance of said processing means is varied using an amplifier means electrically connected between said circuit protection winding and said processing means.

Preferably, if said line voltage is below a predetermined threshold voltage, the impedance of said amplifier means is sufficiently high so that any current imbalance on said electrical installation predominately flows in said secondary winding, or, if said line voltage is above said predetermined threshold voltage, the impedance of said amplifier means is sufficiently low so that any current imbalance on said electrical installation predominately flows in said circuit protection winding.

Further preferably, said predetermined threshold level is around 50V.

In use, said processing means is programmable and includes other ancillary features, such as, undervoltage release and warning indication. Preferably, said secondary winding is a single turn winding.

Further preferably, if said processing means senses that said current imbalance exceeds said predetermined current imbalance, it is also possible to drive an AC tripping current into said circuit protection winding, which will also induce a current imbalance in the secondary winding, thereby effecting operation of said trip mechanism. In use, said AC tripping current is nominally set to be of the order of 1 to 1.5 times the rated trip current.

Preferably, said circuit protection winding has a much higher turns ratio than said secondary winding and further comprises at least two back-to-back diodes to prevent permanent magnetisation of the current transformer.

Also according to the present invention there is provided a method of disconnecting an electric supply to an electrical installation upon detection of a predetermined current imbalance between the line and neutral conductors of said electric supply, said line and neutral conductors inductively coupled as a primary winding of a current transformer; the method comprising the steps of:

monitoring the output of a secondary winding inductively coupled to said current transformer and responsive to said current imbalance on said electrical installation, the output of said secondary winding being connectable to a trip mechanism in said electric supply;

monitoring the output of a circuit protection winding inductively coupled to said current transformer and responsive to said current imbalance on said electrical installation, said circuit protection winding being electrically connectable to a processing means for processing if said current imbalance exceeds said predetermined current imbalance;

sensing said line voltage and comparing such to a predetermined threshold voltage;

modifying the impedance of said processing means depending on the level of said line voltage such that said current imbalance on said electrical installation predominately flows in either of said secondary winding or said circuit protection winding; and tripping said trip mechanism if said current imbalance on said electrical installation exceeds said predetermined current imbalance.

Further according to the present invention there is provided a residual current device having a trip mechanism for isolating an electric supply to an electrical installation upon detection of a predetermined current imbalance between the line and neutral conductors of said electric supply, comprising:

a current transformer having the line and neutral conductors inductively coupled as a primary winding;

a circuit protection winding inductively coupled to said current transformer and responsive to said current imbalance on said electrical installation, said circuit protection winding being connectable to said trip mechanism and to a processing means for processing if said current imbalance exceeds said predetermined current imbalance, such that, in use:

(i) if said line voltage is below a threshold level required to power said processing means, said trip mechanism is responsive to any said current imbalance on said electrical installation; or (ii) if said line voltage exceeds said threshold level, said processing means is operable and drives a tripping current into said trip mechanism responsive to said current imbalance on said electrical installation exceeding said predetermined current imbalance.

Preferably, a delay circuit is electrically connected between said circuit protection winding and said trip mechanism for introducing a predetermined time delay. In use, said trip mechanism is only operable if said current imbalance on said electrical installation exceeds said predetermined current imbalance after said predetermined time delay.

It is believed that a residual current device in accordance with the present invention at least addresses the problems outlined above. The advantages of the present invention are that a residual current device and method are provided which overcome the drawbacks associated with both type (voltage dependent and voltage independent) of modes of operation. Advantageously, the device and method enabling safe and reliable operation when a line voltage is present or not. Further advantageously, the device and method, under normal operation, behaves as a voltage dependent RCD, but in the rare occasion where operation may be required when no line voltage is present, offers voltage independent protection.

A specific non-limiting embodiment of the invention will now be described by way of example and with reference to the accompany drawings, in which.

Figure 3:
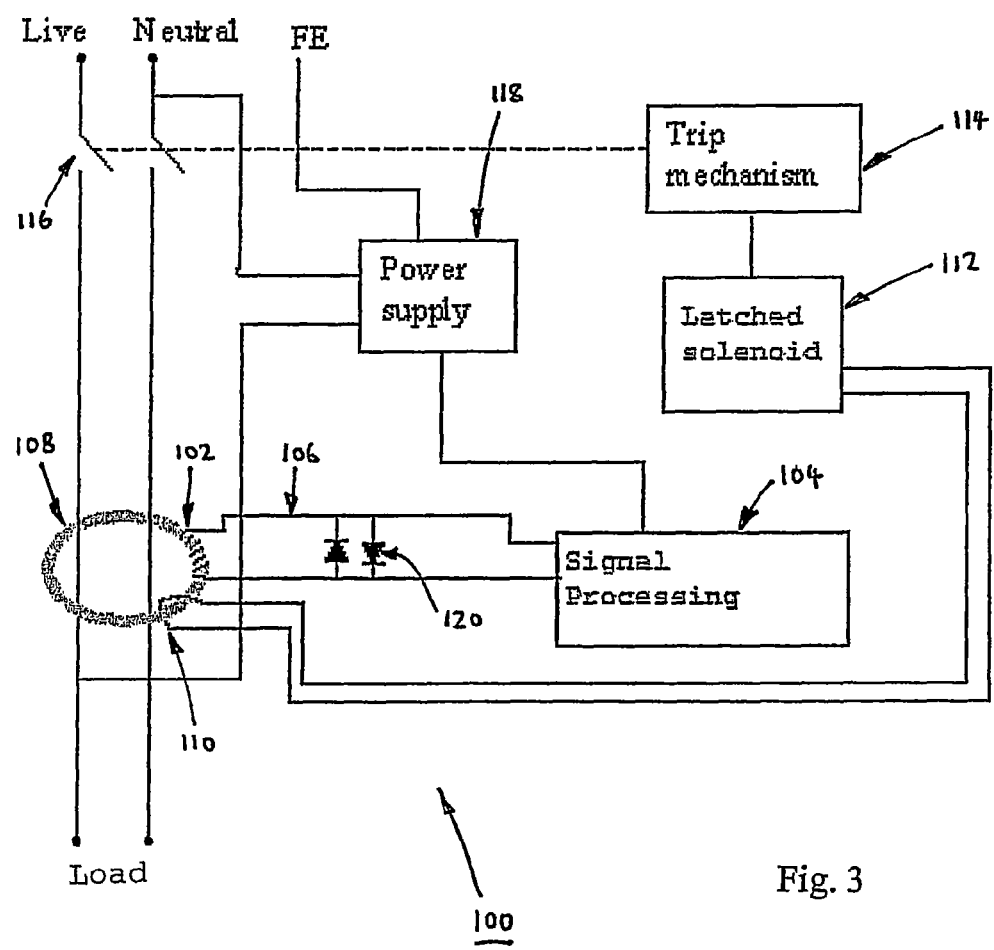
FIG. 3 shows schematically how the present invention is implemented.

Referring now to the drawings, a residual current device 100 according to the present invention is shown schematically in FIG. 3, which utilises a VI architecture as a basis for such residual current device 100. In addition, the RCD 100 includes VD detection electronics for signal processing 104 and extra features. When the line voltage falls below a predetermined threshold level (typically 50V), the device 100 functions in VI mode, as a conventional VI RCD with its inherent advantages. When the line voltage is above the threshold level, the device 100 functions in VD mode, still using the VI toroidal core 108, secondary winding 110 and tripping relay 112, but allowing an electronic processor 104 to measure and determine the tripping level and other ancillary features, such as, for example, undervoltage release and warning indication, etc.

In VD mode, when the power supply 118 is functioning, the RCD 100 is in voltage dependent mode. The protection winding 102 is connected to a low impedance within the signal processor 104, so that any resultant residual current causes current to flow in this winding 102. Any current flowing in this winding 102 automatically demagnetises the core 108. Therefore, the current induced in the, generally, single turn secondary winding 110 will be much smaller than expected in a VI device and so the latching solenoid 112, trip mechanism 114 and contacts 116 do not operate. An alternative view of this mechanism is that by having the advantage of more turns, the protection winding 102 can be used to "steal" current which would otherwise be induced in the single turn secondary winding 110 and so VI operation is effectively disabled. The current in the protection winding 102 can be monitored by the signal processing 104, and used to offer other ancillary features.

When in VD mode, and a residual fault condition is detected, tripping of the device 100 can be initiated by raising the impedance across the protection winding 102 to a high level, such that the winding 102 no longer conducts current and the device resumes VI operation. Since all the fault current is now induced in the secondary trip winding 110, the solenoid 112 is operated and the existing residual current supplies the energy to achieve this. To ensure tripping occurs, it is also possible to drive an AC current into the protection winding 102, which will also induce current in the single turn secondary winding 110, thereby effecting operation of the solenoid 112, as discussed in further detail in respect of FIG. 4.

Figure 1:
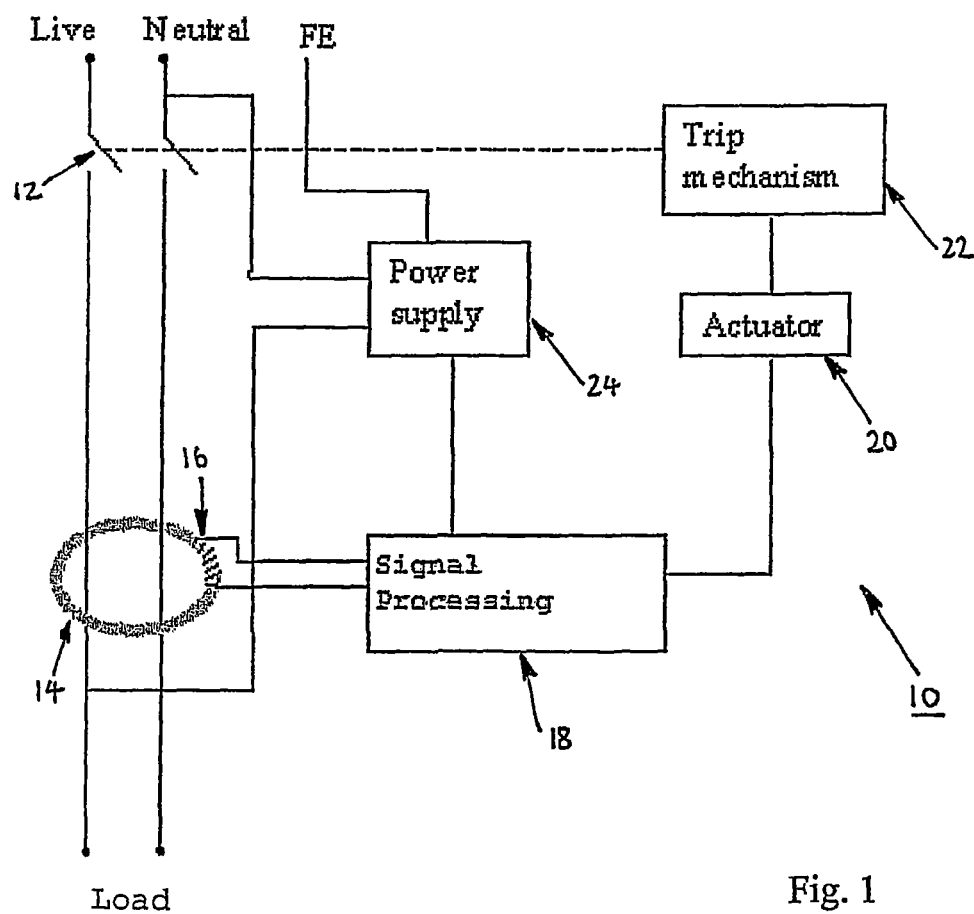
FIG. 1 shows schematically the operation of a known voltage dependent RCD which is capable of monitoring the residual current on an electrical installation when the line voltage is present.
Figure 2:
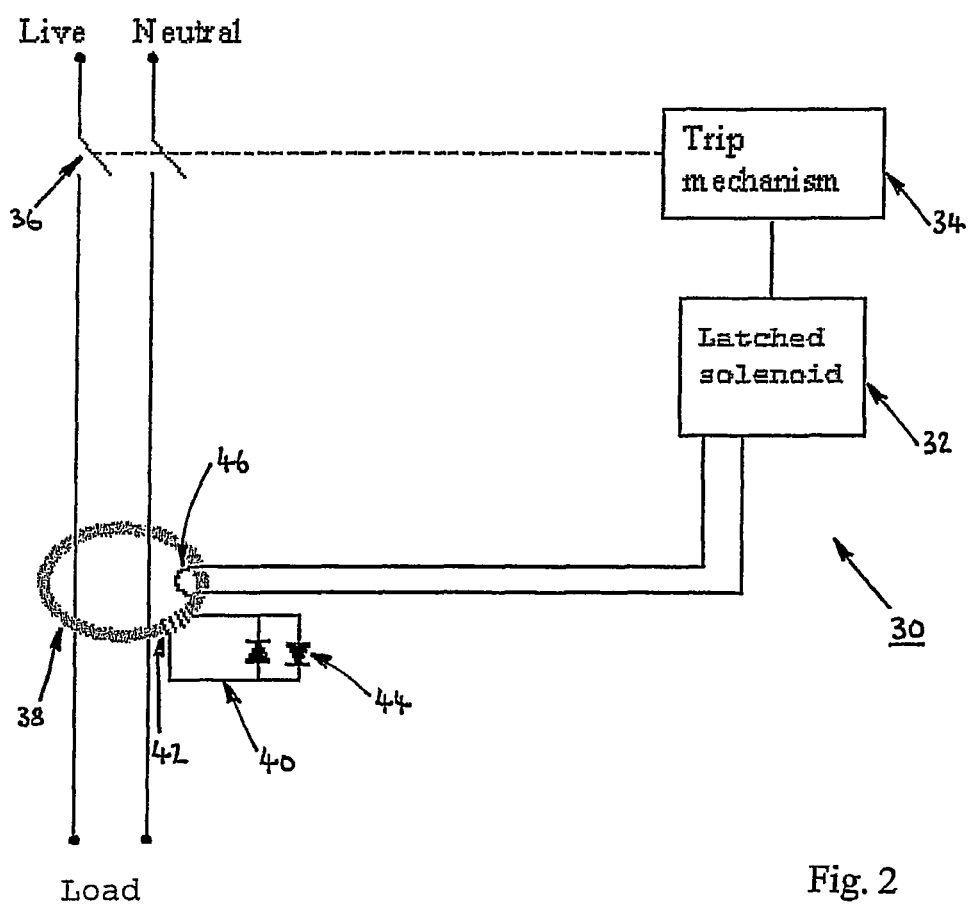
FIG. 2 illustrates the operation of a known voltage independent RCD which is capable of monitoring the residual current on an electrical installation when the line voltage is not present or falls below a predetermined threshold.

In VI mode, when the signal processing circuit 104 is not powered, the signal processing circuit 104 is configured such that the impedance across the protection winding 102 is high, so normal VI operation is unaffected by the extra circuit components. Diodes 120 remain in the protection circuit 106 for the purposes described in relation to FIG. 2, (i.e. the prevention of permanent magnetisation of the toroid 108). In normal VI and VD modes of operation, the voltages across these diodes 120 are never high enough to cause them to conduct.

Figure 4:
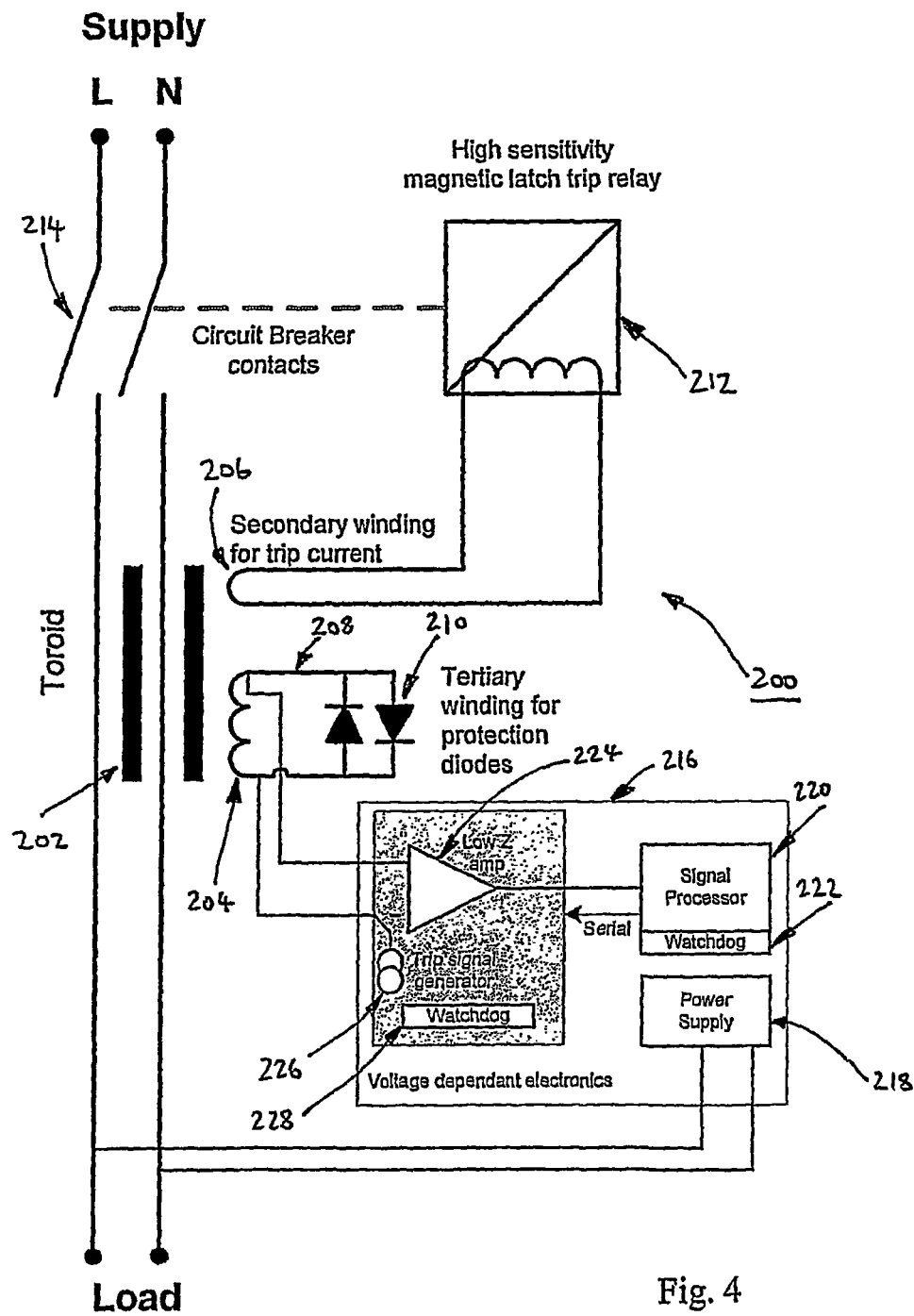
FIG. 4 illustrates further detail of how the present invention is implemented in a digital residual current device.

FIG. 4 shows further detail of the implementation of the device set out schematically in FIG. 3, and shows that the magnetic latch trip 212 is directly connected to the secondary winding 206 on the toroid 202. Also on the toroid 202 is the tertiary protection winding 204 of the standard VI RCD. Within the electronic circuitry stage 216, the signal induced into the tertiary winding 204 is connected to a low impedance amplifier circuit 224. When VD mode line voltage threshold is reached, the amplifier 224 powers-up, via power supply 218, and the input impedance is reduced to a very low level, in the order of 1Ω. As the tertiary protection winding 204 has a much higher turns ratio than the secondary winding 206 and is terminated into a very low impedance, most of the magnetic flux transformed by the toroidal core 202 will result in most of the current flowing in the tertiary winding 204. The current induced in the secondary winding 206 will therefore be much smaller than normal when in VI mode, and so the tripping relay 212 and contacts 214 will not operate at normal levels when in VD mode.

Tripping the device 200 in VD mode can also be achieved by injecting a large current into the tertiary winding 204, via trip signal generator 226, which is transformed into a tripping current in the secondary winding 206 by the sensor core 202 causing the tripping relay 212 to release. This induced current is nominally set to be of the order of 1 to 1.5 times the rated trip current (IΔ). Generally, the size of the induced tripping current is dependent on the sensor's 202 permeability and the construction of the tripping relay 212.

The skilled person will appreciate that the induced tripping current should be consistent with the supply frequency (i.e. AC 50 Hz or 60 Hz) and has to be broadly in phase with the fault current. It is also envisaged that increasing the level of induced tripping current with time could also overcome any minor stiction of the tripping release 212. Clearly, it is better to trip the relay 212 even if the trip time is out of specification than not to trip at all in a dangerous situation.

Tripping the device 200 in VD mode can further be achieved when the current imbalance flowing between the primary conductors exceeds the predetermined current imbalance simply by switching the low impedance amplifier circuit 224 off (resulting in a high impedance) which will cause the fault current to be induced in the secondary winding 206. The resulting imbalance current would be sufficient to cause the relay 212 to trip the mechanism 214. A similar condition will exist in the equivalent circuit described by FIG. 5, as described below.

The frequency response of the device 200 shown in FIG. 4 is largely determined by the toroidal current sensor 202 whose performance is dependent on many factors, including the influence of both the secondary winding 206 inductance and the tertiary winding 204 inductance and the circuit impedance. The primary inductance of the current sensor 202 is also important, but, generally, the circuit impedance is so low it is of little consequence.

Figure 5:
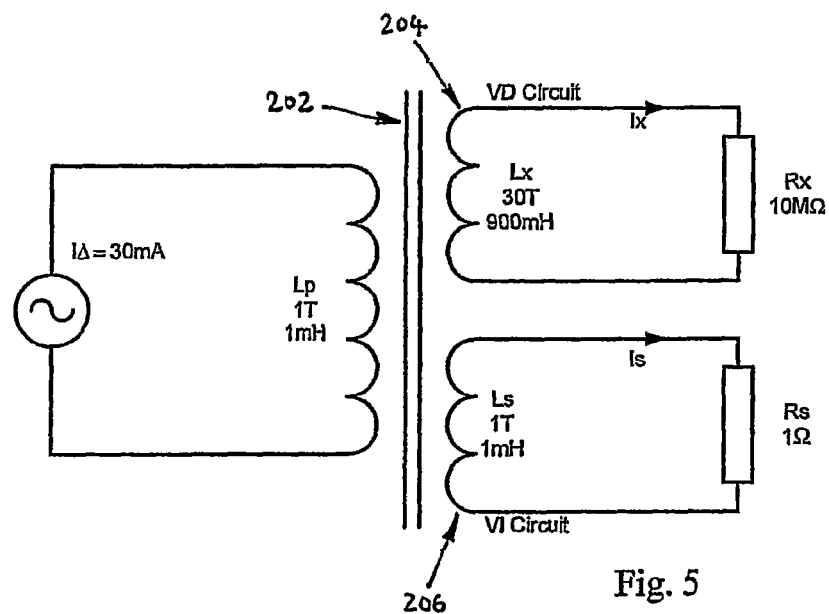
FIG. 5 shows an equivalent circuit of the residual current device shown in FIG. 4 in voltage independent mode.

FIG. 5 shows an equivalent circuit of the device 200 shown in FIG. 4 in VI mode. The component values are typical but can vary considerably for different ranges and combinations of solenoids 212 and toroidal cores 202.

The equivalent circuit shown in FIG. 5 represents the device 200 in VI mode, where the impedance across the protection winding 204 is high. This is shown as a burden resistance $R_x$ having an effective value of 10 MΩ in FIG. 5. As such, the VD circuit which connects to the voltage dependent amplifier 224 and processing 220 is essentially passive, and conducts no current $I_x$. This represents the tertiary protection winding 204. Therefore, all flux produced by a residual current in the single turn primary winding is all coupled to the single turn secondary winding 206 in the VI circuit and the resulting current $I_s$ is conveyed to the solenoid 212 to effect tripping. The solenoid 212 is represented by $R_s$ and is typically about 1Ω. In this case, it takes 10 mA to trip the solenoid 212.

Figure 6:
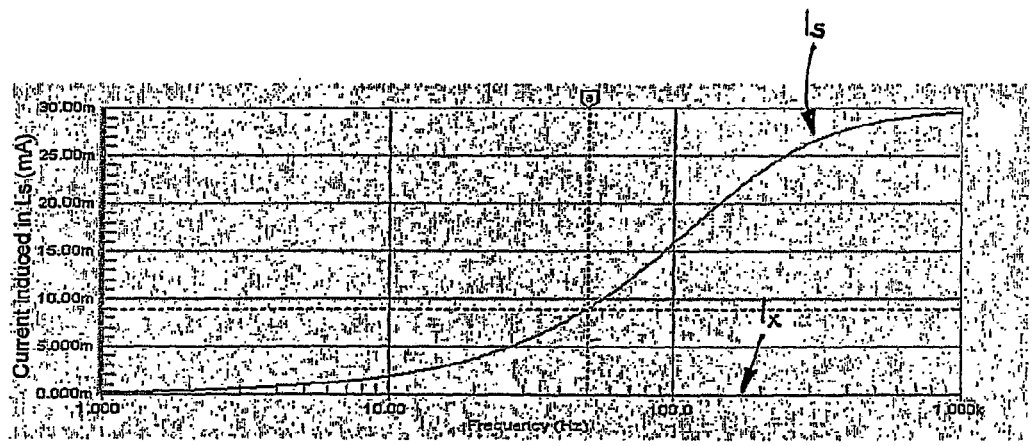
FIG. 6 illustrates the frequency response of the equivalent circuit of FIG. 5.

The frequency response of the equivalent circuit of FIG. 5 is shown in FIG. 6 for a residual current IΔ of 30 mA. It is worth noting that the current $I_x$ in the inductor $L_x$ and hence in the tertiary protection circuit 204 is zero due to its high impedance, but the VI circuit is carrying 9 mA at 50 Hz. This would not cause the solenoid 212 to trip, even though for a 30 mA breaker it should disconnect the supply in this circumstance. This is a problem in reality since the device is working on the slope of the response and variations in core materials or solenoid sensitivity can push the device out of the required specification.

To compensate for this, it is known to subject the whole device 200 to a large variable magnetic field which can modify the holding magnet in the solenoid 212 to adjust its characteristics and, in this case, reduce its tripping threshold from 10 mA to 9 mA. In use, it would be better if the device 200 worked on the plateau of the frequency response but this means more primary turns which is difficult in practice since it consists of large mains conductors. Instead the toroidal core 212 can be made as big as possible to increase inductance.

Figure 7:
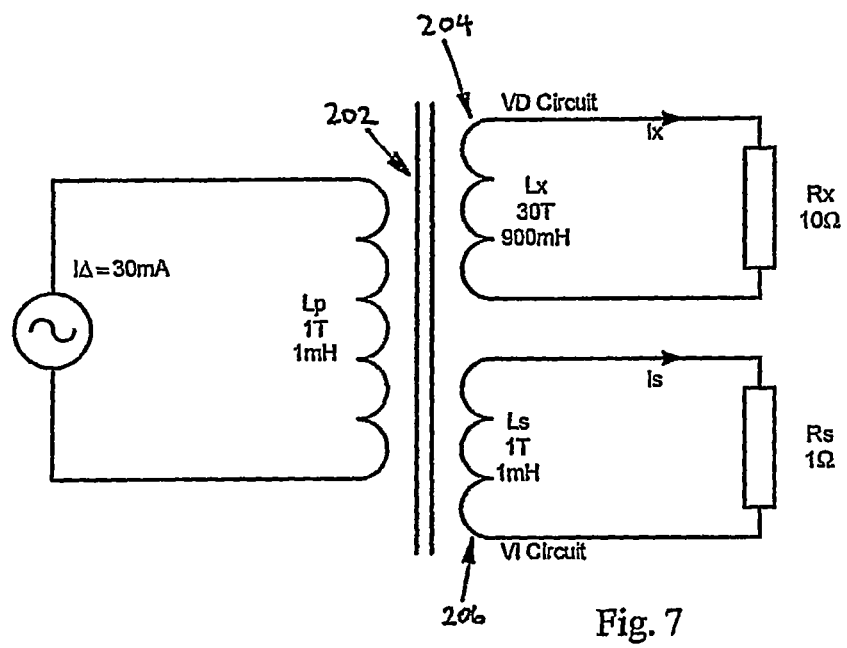
FIG. 7 shows an equivalent circuit of the residual current device shown in FIG. 4 in voltage dependent mode.
Figure 8:
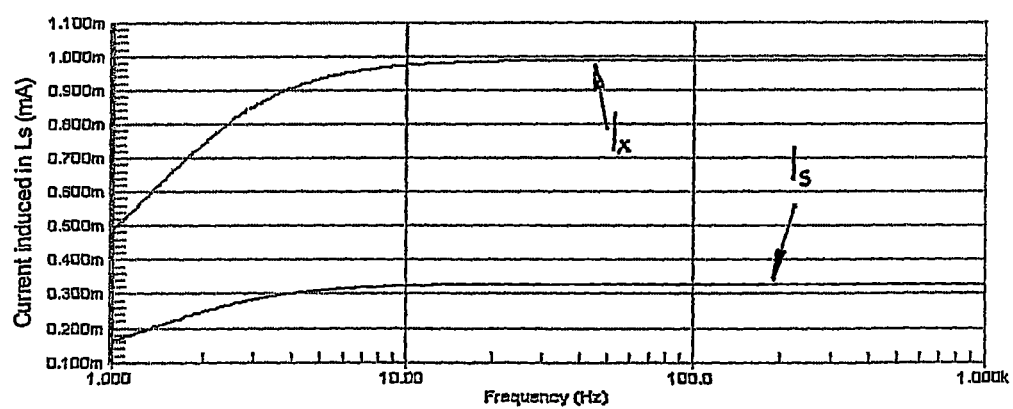
FIG. 8 illustrates the frequency response of the equivalent circuit of FIG. 7.

FIG. 7 shows an equivalent circuit of the device 200 in VD mode. It is worth noting that the tertiary winding 204 now has a low value burden resistance $R_x$ of 10Ω and the voltage across this is measured to determine the fault current $I_x$. FIG. 8 shows the frequency response of the circuit shown in FIG. 7.

The current $I_x$ in the VD circuit is dominant and reaches approximately the value it would if the VI winding 206 was not present (i.e. a value of 1 mA given the 30:1 turns ratio). The response is also now flat and predicable at 50 Hz. The current $I_s$ in the VI circuit is approximately 330 μA and so too low to directly operate the solenoid 212. This current is the cause of the lower than expected current in the VD circuit and the error is directly calculated from the turns ratio of the VI 206 and VD windings 204. In this case, there is a 30:1 ratio so the VD circuit is 330 μA/30 μA=11 μA lower than expected. This error remains fairly constant and small for variations in the core and so can be compensated.

Note that at 50 Hz, the response is now flat since the current sensor 202 is much nearer to 'true' current transformer operation. This means material variations and drift are not significant and calibration is not necessary.

Figure 9:
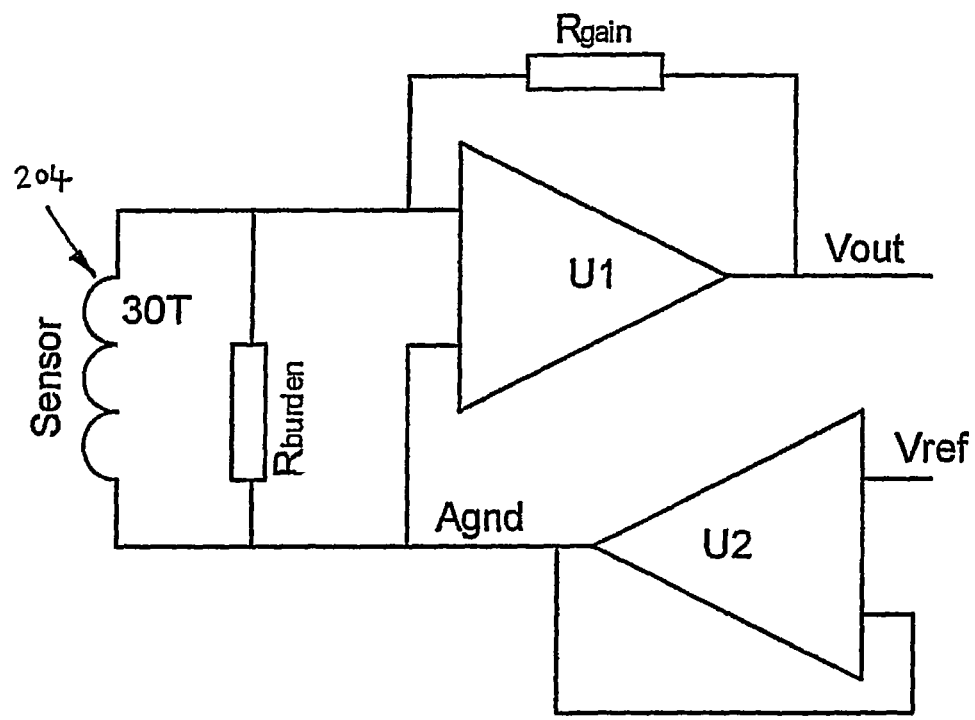
FIG. 9 is a circuit diagram which illustrates in further detail the low impedance amplifier shown in FIG. 4.

FIG. 9 shows the basic schematic arrangement of the low impedance amplifier 224 connected to the circuit protection winding 204 shown in FIG. 4, and depicts one approach using operational amplifiers U1 and U2 to effectively alter the input impedance seen by the circuit protection winding 204.

As shown in FIG. 9, U2 buffers the voltage reference $V_{ref}$ that is used subsequently as the reference for the low impedance amplifier 224 (i.e., U2 is not turned on until the line voltage exceeds a changeover threshold). $V_{ref}$ is the internal reference of the measurement system and its level is mid-rail between $A_{gnd}$ and the analogue supply. Current induced in the protection winding 204 is applied to $R_{burden}$ and the developed voltage is applied to the input terminal of U1. $R_{gain}$ sets the amplifier gain and $V_{out}$ is applied to the measurement system, i.e. the signal processor 220 of FIG. 4.

The main source of errors is the offset voltage developed in U1. Without compensation, the offset voltages would obliterate the voltage developed across $R_{burden}$. To overcome this limitation the amplifier has to be of a low offset design preferably of an auto-zeroing type. In FIG. 9, $R_{burden}$ is shown as a single resistance. In practice, this is composed of the burden resistance and any switch resistance present in the circuit.

When the device is operating in voltage independent mode, U1 and U2 are turned off and the input impedance rises to the order of several MΩ.

However, if small surge currents are present these could cause the relay to actuate so causing nuisance tripping. To improve the susceptibility to nuisance tripping due to surge currents, two options have been considered. This firstly could be achieved by reducing the value of $R_{burden}$. In reality, this is difficult to achieve, as physically implementing a small resistance with a low tolerance is difficult either in a discrete solution or as part of a silicon implementation of the electronic circuitry 216. In silicon, the low resistance is determined by any switch resistance in the circuit path and the physical size of the resistance when implemented on the silicon substrate. In practical terms, the minimum resistance is typically 10Ω.

The second option is to increase the turns ratio of the protection winding 204. This effectively lowers the resistance of $R_{burden}$. The maximum number of turns is dependent on the following factors: (i) physical space in the device; (ii) toroidal core material (and its effect on permeability); (iii) diameter of the line and neutral conductors; and (iv) resistance of the trip relay. Typically, the turns ratio is unlikely to exceed 100, because of any one or more of the listed factors.

Considering the architecture of the devices described above, the person skilled in the art will appreciate that there a number of factors that determine the mode of operation of the device:—

(i) Electronics start-up time—any electronic circuit requires a finite time for the power supply to stabilise and the measurement system to initialise. In practice, this can be in the range of 5 to 10 ms depending on the line voltage, and hence how much current the power supply can draw to start up. EN/IEC 61008 requires the device to respond to a gross fault>5IΔ or >500A within 40 ms. While this could be achieved using the VD electronics 216 in the time available (<30 ms), it is more advantageous to allow the VI circuit 206, 212 to handle gross faults. Therefore, at start up and at $U_L$>Changeover limit, a 40 ms delay is added to ensure a smooth transition from VI mode to VD mode.

(ii) Supply voltage—all electronic RCDs require a minimum level of supply voltage to function, typically in the order of 80V, although some devices can operate down to 50V. It can be argued that below 50V there is a reduced hazard of electric shock, but there is always the potential for a residual current fault which electronic RCD devices could not protect against.

(iii) Electronic failure—All mechanical and electronic RCDs have a finite lifetime which is usually determined by the types of components used in construction and the operational environment. Using reliability models compatible with IEC 61508, it can be determined that the two main failure modes are (a) Failure to detect; and (b) Failure to trip.

As mentioned above there are two fault scenarios that will prevent the device operating correctly in VD mode, 'Failure to detect' and 'Failure to trip'. The electronic circuit 216 connected to the protection circuit 208, is composed of three essential circuit blocks, namely the power supply 218; the low impedance amplifier 224 and the signal processor 220.

Any failure of the power supply 218 will cause the low impedance amplifier 224 to turn off and the RCD 200 will therefore return to VI mode. As shown in FIG. 4, the low impedance amplifier 224 and the signal processor 220 are connected by a serial interface used for configuration and signal selection. The serial port in the low impedance amplifier 224 is connected to a watchdog timer 228 which is reset with every serial transmission. If the processor 220 stops or executes a programme abnormally, the serial transmission will stop and the watchdog timer 228 will timeout returning the device to VI mode. The timeout period is programmable but is typically <40 ms. This ensures that even when a gross earth fault occurs simultaneous with an electronics failure (double fault), the device 200 will trip within the specified time by returning to VI mode.

The signal processor 220 also has a similar watchdog timer 222 which is able to reset the signal processor 220 and restart its operation should the programme execute abnormally or stop. In this case, the serial transmission will stop momentarily and the low impedance amplifier 224 will return to VI mode, while the reset operation takes place.

The skilled person will therefore appreciate that each main circuit block can initiate a hardware-based operation to return the RCD 200 to VI mode, should an electronics failure occur.

Table 1 summarises the operational state of the RCD 200 under various operating conditions.

TABLE 1

|  | Switch on | Switch on + $T_{start}$ | $U_L$ < Changeover limit | $U_L$ > Changeover limit | Electronic failure |
|---|---|---|---|---|---|
| VI | X |  | X |  | X |
| VD |  | X |  | X |  |

Switch On

At switch on, whilst the power supply stabilises, the device 200 operates in a VI manner using the RCD sensor's single turn secondary winding 206 and the trip relay 212. At this time, the performance of the device is largely governed by the permeability of the sensor core 202 and the performance of the trip relay 212. If there are large earth leakage currents at start up, these will be detected by the VI circuit 202, 206 causing the trip mechanism 212 to open the contacts 214.

Switch On+$T_{start}$

Once the line voltage has reached or exceeded the minimum operating voltage, the power supply 218 starts and the low impedance amplifier 224 and the signal processor 220 initialise. The low impedance amplifier 224 is not turned on until the line voltage exceeds a changeover threshold. At this time, the amplifier input impedance is reduced to almost 0Ω and any flux in the toroidal core 202 will be diverted to induce a current principally in the tertiary winding 204. The changeover voltage is always higher than the minimum operating voltage, in order to ensure a reliable and repeatable transition from VI mode to VD mode.

$U_L$<Changeover Limit

During operation in VD mode, if the line voltage $U_L$ falls below the changeover limit, the input amplifier $U_L$ is turned off into a high impedance state, therefore returning the device 200 to VI mode.

$U_L$>Changeover Limit

This is a similar situation as described in Switch on+$T_{start}$. The power supply 218 is active but the line voltage $U_L$ has previously been below the changeover limit. Once the line voltage exceeds the changeover limit, the input amplifier U1 is turned on and the input impedance is reduced to almost 0Ω and any flux in the core 202 will be diverted to induce a current in the tertiary winding 204. Note it is not necessary for the changeover limit to be at the same level in both of the previous cases, indeed it may be more advantageous for the limit to be higher in the second case to prevent continuous changes from VI to VD modes at the lower $U_L$<changeover limit.

Figure 10:
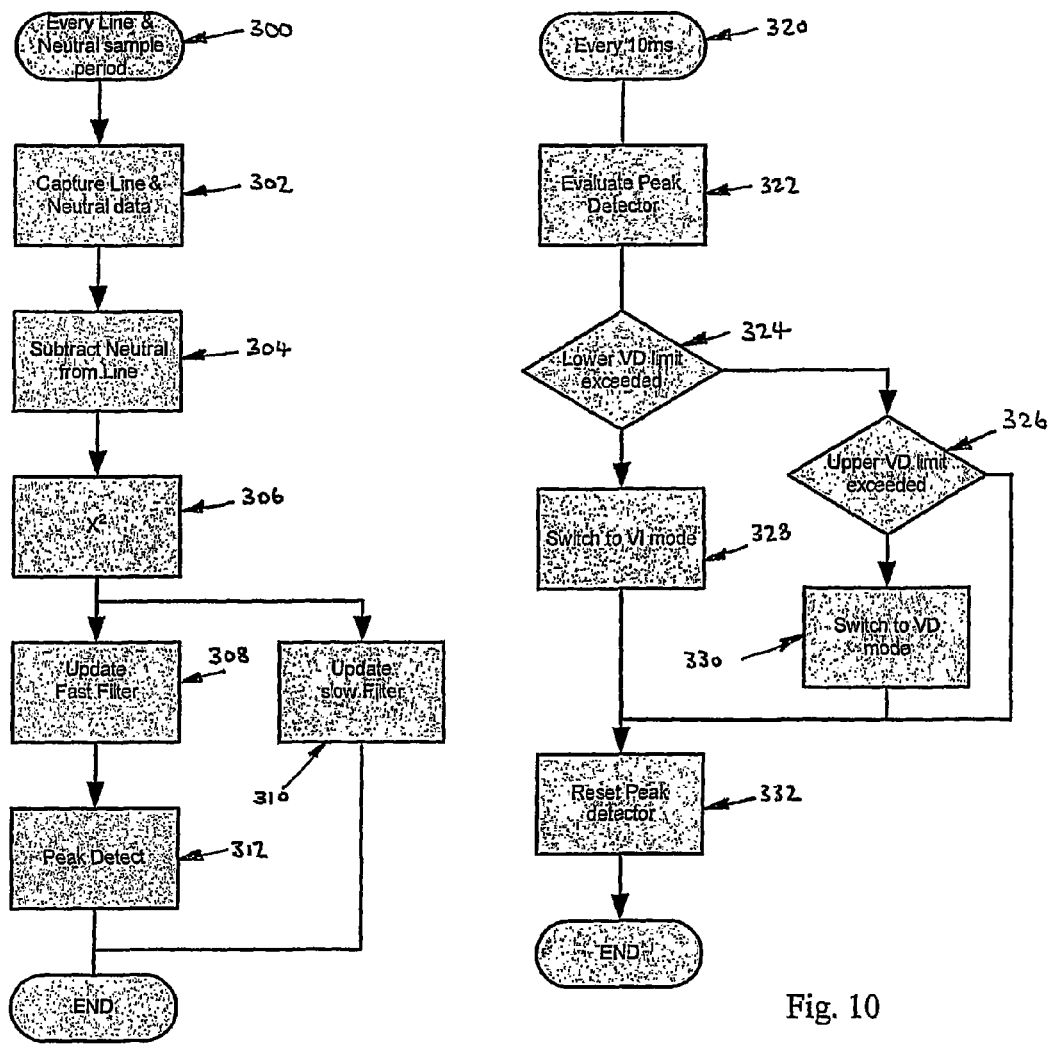
FIG. 10 shows a processing algorithm according to the present invention that determines the changeover between voltage dependent and independent modes of operation.

FIG. 10 shows the processing algorithm used to determine the changeover between VI mode and VD modes. The software uses a number of event timers and associated interrupts to process different activity streams. The main point to note is the use of two filters to process the voltage measurements. The slow filter is used for accurate voltage measurement if required by the RCD. The fast filter is solely for determining if the changeover between VI and VD modes is required. The left-hand side of FIG. 10 is performed every 330 µs (60 samples per cycle), while the right-hand side is performed every ½ cycle (10 ms), so the fast signal capture is performed with a sampling frequency of around 2.6 Khz, while the decision to switch to VI mode is performed every ½ cycle.

Referring to the left-hand side of FIG. 10, every 330 µs (block 300) the line and neutral data is captured 302. The line and neutral channels ideally need to sampled simultaneously, however, in a practical device, these can be sampled in successive acquisitions. For a multi-phase device, the skilled person will appreciate that the same sampling order must be maintained.

At blocks 304 and 306, the neutral is subtracted from the line voltage and the mean squared of the line to neutral voltage is calculated. At blocks 308 and 310, the new measurement value is pushed into the fast and slow filters. The product of the fast filter is then applied to a peak detector 312 to evaluate the maximum value of the line to neutral voltage.

Every 10 ms (block 320), the peak detector is evaluated 322 to determine if it has breached the minimum or maximum changeover threshold by converting the mean squared line to neutral voltage to a root mean squared value. At blocks 324 and 326, a comparison of the RMS line to neutral voltage to the changeover limit is made. If the RMS line to neutral voltage is below the changeover limit, the device is switched to VI mode 328. At this point, the amplifier circuit 224 is turned-off, thereby setting the input impedance high. If the RMS line to neutral voltage is above the changeover limit, the device is switched to VD mode 330 by turning on amplifier 224, thereby setting the input impedance low. At block 332, the peak detector is reset and rests for the next ½ cycle.

Electronic Failure

Any failure of the electronic circuit 216 connected to the protection circuit 208 will cause the low impedance amplifier 224 to turn off and the RCD 200 will therefore return to VI mode, as noted above.

Figure 11:
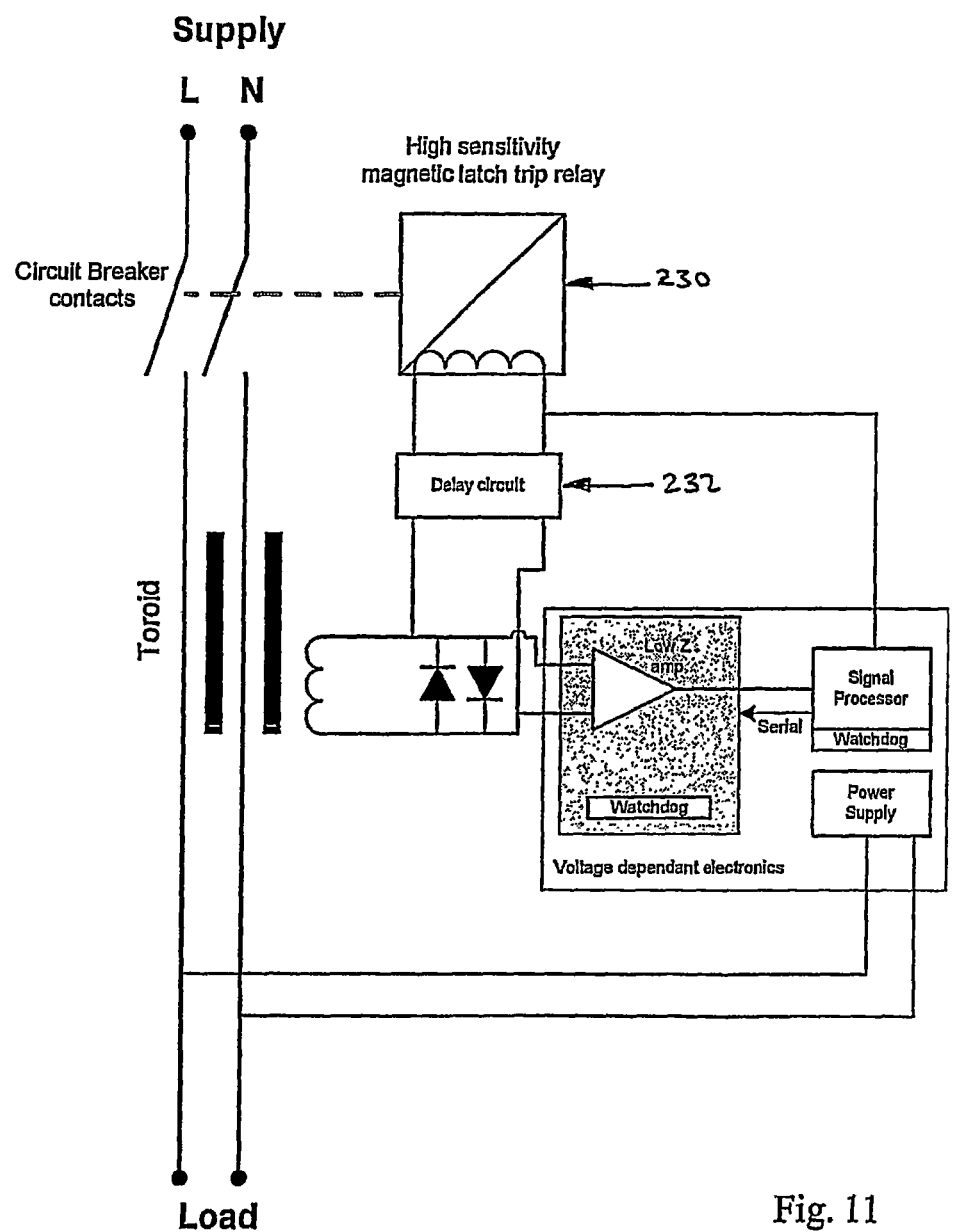
FIG. 11 shows an alternative technique for providing both voltage dependent and independent residual current protection.

FIG. 11 shows the general arrangement of an alternative embodiment of the present invention.

In recent years, an alternative VI structure has been available, whereby a high-impedance tripping relay 230 has been used in conjunction with a delay circuit 232. The purpose of this approach is to reduce the VI circuit's 206, 212 susceptibility to surge/impulse currents that could cause false tripping with the embodiment of FIG. 4. This construction has been incorporated in the present invention; the main difference between the embodiment of FIG. 4 and that set out in FIG. 11 is the manner in which the tripping relay 230 is actuated. Since the turns ratio of high-impedance tripping relay 230 is higher it is more advantageous to drive the relay 230 directly from the electronics 216 when in VD Mode.

In VI mode, the actuator drive and the input amplifier is in a high impedance state, any induced fault current is applied to the delay circuit 232 and subsequently to the tripping relay 230 in the conventional manner. When the line voltage is above the VD mode threshold, the detection and measurement electronics 216 is turned on and the input amplifier is in a low impedance state, and the circuit responds in the same way as previously described. When the tripping relay 230 is required to operate, an actuator port on the signal processor 220 drives current directly into the trip relay 230 causing it to open. The actuator port is an I/O port on the signal processor 220 used to trip the magnetic latch relay 230 in a high-impedance configuration. The port only requires low voltage (3 to 5V) and limited current (up to 10 mA) capacity to trip a typical relay 230. The port should also be tri-state capable, for when operating in VI mode.

The significant improvement with this embodiment, is the increase in available current to activate the tripping relay 230. In VI mode, this current is typically in the order of 400 µA, whilst in VD mode, this can be in the order of several mA. This increased current may help to improve the reliability of the tripping relay 230, if the relay has only minor 'stiction'.

Various alterations and modifications may be made to the present invention without departing from the scope of the invention. For example, although particular embodiments refer to implementing the present invention on a single phase electrical installation, this is in no way intended to be limiting as, in use, the present invention can be incorporated into larger installations, both single and multi-phase.

The invention claimed is:

1. A residual current device having a trip mechanism for isolating an electric supply to an electrical installation upon detection of a predetermined current imbalance between the line and neutral conductors of said electric supply, comprising:
   a current transformer having the line and neutral conductors inductively coupled as a primary winding;
   a secondary winding inductively coupled to said current transformer and connectable to said trip mechanism, said secondary winding being responsive to said current imbalance on said electrical installation; and
   a circuit protection winding inductively coupled to said current transformer and responsive to said current imbalance on said electrical installation, said circuit protection winding being connectable to a processing means for processing if said current imbalance exceeds said predetermined current imbalance, the impedance of said processing means varies according to the level of said line voltage, wherein the impedance of said processing means is varied using an amplifier means, and wherein if said line voltage is below a predetermined threshold voltage, the impedance of said amplifier means is sufficiently high so that any current imbalance on said electrical installation predominately flows in said secondary winding, or, if said line voltage is above said predetermined threshold voltage, the impedance of said amplifier means is sufficiently low so that any current imbalance on said electrical installation predominately flows in said circuit protection winding.

2. The residual current device as claimed in claim 1, wherein said predetermined threshold level is around 50V.

3. The residual current device as claimed in claim 1, wherein said processing means is programmable.

4. The residual current device as claimed in claim 1, wherein said secondary winding is a single turn winding.

5. The residual current device as claimed in claim 1, wherein if said processing means senses that said current imbalance exceeds said predetermined current imbalance an AC tripping current is driven into said circuit protection winding, which will also induce a current imbalance in the secondary winding.

6. The residual current device as claimed in claim 5, wherein said AC tripping current is nominally set to be of the order of 1 to 1.5 times the rated trip current.

7. The residual current device as claimed in claim 5, wherein said AC tripping current is in phase with said current imbalance on said electrical installation.

8. The residual current device as claimed in claim 5, wherein the level; of said AC tripping current increases with time.

9. The residual current device as claimed in claim 1, wherein said circuit protection winding has a much higher turns ratio than said secondary winding and further comprises at least two back-to-back diodes to prevent permanent magnetization of the current transformer.

10. A residual current device having a trip mechanism for isolating an electric supply to an electrical installation upon detection of a predetermined current imbalance between the line and neutral conductors of said electric supply, comprising:
   a current transformer having the line and neutral conductors inductively coupled as a primary winding;
   a secondary winding inductively coupled to said current transformer and connectable to said trip mechanism, said secondary winding being responsive to said current imbalance on said electrical installation; and
   a circuit protection winding inductively coupled to said current transformer and responsive to said current imbalance on said electrical installation, said circuit protection winding being connectable to a processing means for processing if said current imbalance exceeds said predetermined current imbalance, the impedance of said processing means varies according to the level of said line voltage, wherein the impedance of said processing means is varied using an amplifier means; and
   wherein if said processing means senses that said current imbalance exceeds said predetermined current imbalance, said amplifier means is turned off so that said current imbalance on said electrical installation predominately flows in said secondary winding.

11. A method of disconnecting an electric supply to an electrical installation upon detection of a predetermined current imbalance between the line and neutral conductors of said electric supply, said line and neutral conductors inductively coupled as a primary winding of a current transformer; the method comprising the steps of:

monitoring the output of a secondary winding inductively coupled to said current transformer and responsive to said current imbalance on said electrical installation, the output of said secondary winding being connectable to a trip mechanism in said electric supply;

monitoring the output of a circuit protection winding inductively coupled to said current transformer and responsive to said current imbalance on said electrical installation, said circuit protection winding being electrically connectable to a processing means for processing if said current imbalance exceeds said predetermined current imbalance;

sensing said line voltage and comparing such to a predetermined threshold voltage;

modifying the impedance of said processing means depending on the level of said line voltage such that said current imbalance on said electrical installation predominately flows in either of said secondary winding or said circuit protection winding; and tripping said trip mechanism if said current imbalance on said electrical installation exceeds said predetermined current imbalance;

wherein the step of modifying the impedance of said processing means depending on the level of said line voltage comprises using an amplifier means, and sensing if said line voltage is below a predetermined threshold voltage and setting the impedance of said amplifier means sufficient high so that any current imbalance on said electrical installation predominately flows in said secondary winding, or, if said line voltage is above said predetermined threshold and setting the impedance of said amplifier means sufficiently low so that any current imbalance on said electrical installation predominately flows in said circuit protection winding.

12. The method as claimed in claim 11, wherein said predetermined threshold level is around 50v.

13. The method as claimed in claim 11, wherein said secondary winding is a single turn winding.

14. The method as claimed in claim 11, wherein the step of tripping said trip mechanism if said current imbalance of said electrical installation exceeds said predetermined current imbalance further comprises the step of injecting an AC tripping current into said circuit protection winding which induces a current imbalance in the secondary winding.

15. The method as claimed in claim 14, wherein said AC tripping current is nominally set to be of the order of 1 to 1.5 times the rated trip current.

16. The method as claimed in claim 14, wherein said AC tripping current is in phase with said current imbalance on said electrical installation.

17. The method as claimed in claim 14, wherein the level of said AC tripping current increases with time.

18. A method of disconnecting an electric supply to an electrical installation upon detection of a predetermined current imbalance between the line and neutral conductors of said electric supply, said line and neural conductors inductively coupled as a primary winding of a current transformer; the method comprising the steps of:

monitoring the output of a secondary winding inductively coupled to said current transformer and responsive to said current imbalance on said electrical installation, the output of said secondary winding being connectable to a trip mechanism in said electric supply;

monitoring the output of a circuit protection winding inductively coupled to said current transformer and responsive to said current imbalance on said electrical installation, said circuit protection winding being electrically connectable to a processing means for processing if said current imbalance exceeds said predetermined current imbalance;

sensing said line voltage and comparing such to a predetermined threshold voltage;

modifying the impedance of said processing means depending on the level of said line voltage such that said current imbalance on said electrical installation predominately flows in either of said secondary winding or said circuit protection winding; and tripping said trip mechanism if said current imbalance on said electrical installation exceeds said predetermined current imbalance;

wherein the step of modifying the impedance of said processing means depending on the level of said line voltage comprises using an amplifier means; and wherein the step of tripping said trip mechanism if said current imbalance on said electrical installation exceeds said predetermined current imbalance further comprises the step of turning said amplifier means off so that said current imbalance on said electrical installation predominately flows in said secondary winding.

* * * * *

UNITED STATES PATENT AND TRADEMARK OFFICE
CERTIFICATE OF CORRECTION

PATENT NO. : 8,446,699 B2
APPLICATION NO. : 12/296869
DATED : May 21, 2013
INVENTOR(S) : Jonathan Keith Jackson It is certified that error appears in the above-identified patent and that said Letters Patent is hereby corrected as shown below:

In the Claims

Col. 12, Claim 8, Line 33:
DELETE after level ";"

Col. 13, Claim 14, Line 43:
DELETE after imbalance "of"
ADD after imbalance --on--

Col. 14, Claim 18, Line 12:
DELETE after and "neural"
ADD after and --neutral--

Signed and Sealed this
Second Day of July, 2013

Teresa Stanek Rea
*Acting Director of the United States Patent and Trademark Office*